United States Patent [19]

Toyoda et al.

[11] Patent Number: 4,692,009
[45] Date of Patent: Sep. 8, 1987

[54] BRAKING DEVICE FOR SHUTTER

[75] Inventors: Yasuhiro Toyoda, Kanagawa; Fumio Shimada; Katsumi Yoshida, both of Saitama, all of Japan

[73] Assignee: Canon Kabushiki Kaisha, Japan

[21] Appl. No.: 777,858

[22] Filed: Sep. 18, 1985

Related U.S. Application Data

[63] Continuation of Ser. No. 659,724, Oct. 11, 1984, abandoned.

[30] Foreign Application Priority Data

Oct. 18, 1983 [JP] Japan .......................... 58-161748[U]

[51] Int. Cl.$^4$ ............................................. G03B 9/40
[52] U.S. Cl. ................................................... 354/246
[58] Field of Search ....................... 354/241, 245–249, 354/252

[56] References Cited

U.S. PATENT DOCUMENTS 4,109,266  8/1978  Inoue .................................... 354/246
4,110,773  8/1978  Scholz ................................... 354/252
4,302,091  11/1981 Harase et al. ......................... 354/246
4,316,662  2/1982  Tosaka et al. ................... 354/252 X

FOREIGN PATENT DOCUMENTS 3126589  3/1982  Fed. Rep. of Germany ...... 354/252

Primary Examiner—W. B. Perkey
Attorney, Agent, or Firm—Toren, McGeady & Associates

[57] ABSTRACT

The present invention relates to a braking device for a focal plane shutter in a camera. In the early stage of a braking operation on a shutter curtain, a relatively weak braking force is applied, and in the closing stage of the braking operation, a strong braking force is applied to insure that without causing the shutter curtain to bounce or to be damaged by shock, the shutter curtain is stopped. The device is constructed from two brake members arranged so that in the early stage the first brake member takes action, and in the closing stage, the second brake member takes action to add a braking force to that of the first brake member.

8 Claims, 6 Drawing Figures

BRAKING DEVICE FOR SHUTTER

This is a continuation, of application Ser. No. 659,724, filed Oct. 11, 1984, now abandoned.

BACKGROUND OF THE INVENTION

1. Field of the Invention

This invention relates to a braking device for a focal plane shutter for a camera.

2. Description of the Prior Art

The prior known braking device for shutters is made to brake the shutter curtain within a relatively short stroke near the terminal end of running movement of the shutter, for the curtain is prevented from bouncing. But when the frictional force is too strong at the start position of braking, the shutter curtain adversely bounces, producing disadvantages that the exposure becomes uneven near the side of the picture frame and that the curtain stops without having to reach the terminal end of running movement.

For this reason, a proposal has been made for such a braking device that the force of a compression spring for giving a braking force to the shutter is relatively weak at the braking start position and gradually increases to insure that the shutter is stopped at the exposure aperture fully closing position, as, for example, disclosed in U.S. Pat. No. 2,218,767.

In case when another brake which cannot change the pushing pressure of the spring for exerting frictional forces between the initiation and termination of a braking operation because of no availability of space, since, from the nature of friction, the static friction is larger than the dynamic one, it results that the braking force is maximum at the braking start position and then gradually increase. Therefore, for an adequate braking force is obtained in the closing position, the frictional force to take action in the early stage becomes very strong, thus giving a shock to the shutter curtain, reducing the durability, and producing the aforesaid phenomenon that the exposure is made out of uniformity, and the full closing of the exposure aperture fails. Such static friction tends to increase particularly at low temperatures.

Also in the blade type focal plane shutter, as the blade is deformed by the shock in the braking start position, the border of the trailing curtain collides against the edge of an exposure aperture in a partition plate intervening between the leading and trailing curtains and is hindered to run down. There will be also a high possiblity of damaging the curtain.

SUMMARY OF THE INVENTION

The present invention has for its general object to provide a frictional braking device for a focal plane shutter in which without varying the pushing pressure of the spring, the braking force is nevertheless made variable, being relatively weak in the early stage of a braking operation and being sufficiently strong in the closing stage of the braking operation.

To achieve this, according to the present invention, the device is constructed from a first brake member arranged to engage a shutter operating member when the slit forming border of a shutter curtain lies within the exposure aperture, thereby a relatively weak prescribed frictional force is extered to brake the shutter operating member, and a second brake member arranged to engage the shutter operating member when the aforesaid slit forming border has passed across the rear side of the exposure aperture and nears the terminal end of movement thereof, thereby a prescribed braking force is applied to the shutter operating member, the first and second brake members being positioned in superimposed relation so that in the closing stage of the braking operation, the first and second brake members cooperate with each other to give a sufficiently large braking force to the shutter curtain.

The present invention is described in the following in connection with an embodiment thereof by reference to the accompanying drawings.

BRIEF DESCRIPTION OF THE DRAWINGS

The drawings illustrate an embodiment of the present invention.

DETAILED DESCRIPTION OF THE PREFERRED EMBODIMENTS

Figure 1:
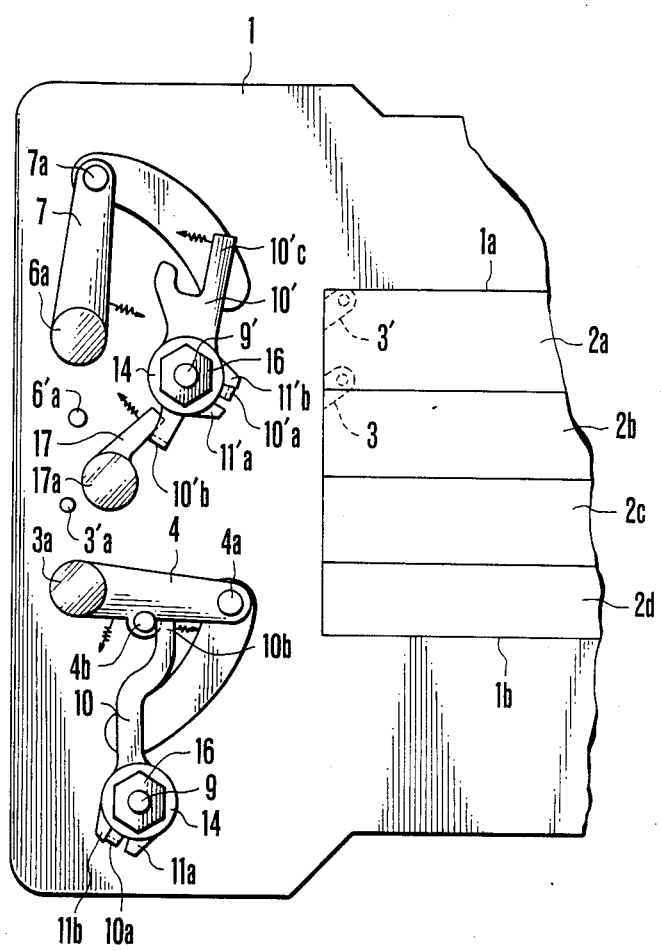
FIG. 1 is an elevational view of a braking device in a position where the shutter is ready to run.
Figure 2:
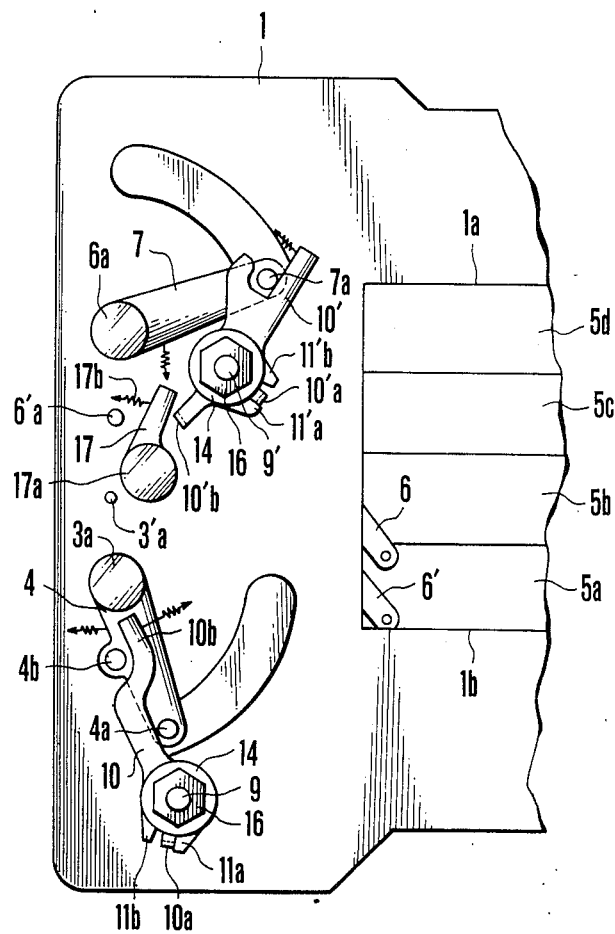
FIG. 2 is an elevational view of the braking device in another operative position where the shutter has run.

In FIGS. 1 and 2 there is shown part of a blade type focal plane shutter to which the present invention is applied with FIG. 1 in a shutter charged position and FIG. 2 in a shutter released position. In the drawings, 1 is a shutter base plate fixedly mounted to a camera housing (not shown) in prescribed spaced relation to another base plate (not shown) of almost similar shape, between which leading and trailing curtains of the shutter each comprising a plurality of divided blades are held. The blades of each of the leading and trailing curtains are, as well known in U.S. Pat. No. 4,024,555, for example, pivotally supported by two operating arms to move in a parallel linking way to open and close an exposure aperture 1a. The leading and trailing curtains are separated from each other by a partition plate (not shown) having an aligned exposure aperture to that 1a of either one of the base plates to be able to operate without interference with each other.

2a–2d are divided blades constituting the leading curtain and each pivotally mounted on the arms 3 and 3'.

3a and 3'a denote pivot shafts of said arms.

5a–5d are divided blades constituting the trailing curtain and each pivotally mounted on the arms 6 and 6'. 6a and 6'a are pivot shafts of said arms.

Figure 3:
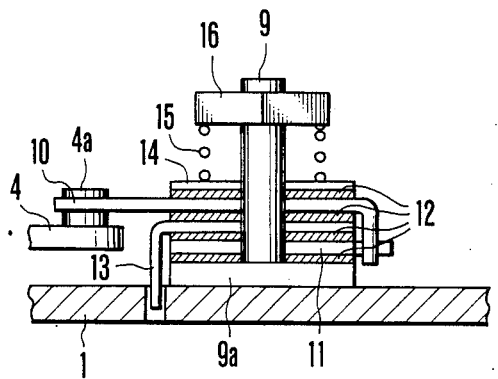
FIG. 3 is a sectional view of the brake shaft.

Drive levers 4 and 7 for transmitting driving power of springs to the operating arms 3 and 6 are supported to be pivotally movable about the shafts 3a and 6a and have pins (not shown) planted on the lower surfaces thereof which extend through arcuate slots provided in the base plate 1 into holes of the operating arms 3 and 6 so that the drive levers 4 and 7 turn as a unit with the arms 3 and 6 respectively. Pins 4a and 7a are planted on the upper surfaces of the drive levers 4 and 7 and arranged to be engageable with brake actuating levers. Brake shafts 9 and 9' are fixedly mounted on the base plate 1. FIG. 3 illustrates the section of the brake shaft 9 for the leading curtain. 10 is the first actuating lever rotatably fitted on the shaft 9; 13 is an intermediate plate fitted on the shaft 9 and restrained from rotation by its bent portion engaging in a hole of the base plate 1; 11 is the second actuating lever rotatably fitted on the shaft 9. These parts are superimposed on a flanged portion 9a of the shaft 9 along with four frictional members 12 between the successive two parts, and receive a pressure of a spring 15 through a pressor plate 14 slidingly movably fitted on the shaft 9 and restrained from rotation. 16 is a tightening nut. Another brake for the trailing curtain has a similar structure of construction with a first actuating lever 10' and a second actuating lever 11'.

In the leading curtain brake, one arm of the first actuating lever 10 is arranged to engage with the pin 4a when the drive lever 4 nears the terminal end of rotative movement thereof and its free end 10b is arranged to engage with another pin 4b on the lever 4. The second actuating lever 11 has arms 11a and 11b formed to a forked shape between which a bent arm 10a of the first actuating lever lies loosely.

17 is a setting lever for the aforesaid trailing curtain brake pivotally mounted at a pin 17a and arranged to engage with the bent arm 10'b of the actuating lever 10'.

When a winding up operation is initiated from the shutter running completion position of FIG. 2, as a charge lever (not shown) turns, the leading curtain drive lever 4 and the trailing curtain drive lever 7 turn about the respective pivot shafts 3a and 6a in a counterclockwise direction, while charging shutter drive springs. To follow up this, the operating arms 3, 3' and 6, 6' turn about their respective pivot shafts, moving the leading and trailing blades upward as viewed in FIGS. 1 and 2 until the trailing blades 5a to 5d are stored in folded ralation on the upper vicinity of the exposure aperture 1a, and the leading blades 2a to 2d are spread to fully cover the exposure aperture 1a. When all the blades are held stationary in such positions, the shutter becomes ready to make the next exposure.

During this time, the leading curtain brake is reset in such a way that the first actuating lever 10 is turned about the shaft 9 in the clockwise direction by the pin 4b on the drive lever 4 engaging with the free end 10b. When the angle of rotation of the lever 10 has reached a prescribed value, the bent arm 10a comes to engage one arm 11b of the second actuating lever 11. After that, the first and second actuating levers 10 and 11 are turned in unison and reach the initial positions when the charging of the shutter is completed.

Also in response to rotative movement of the aforesaid charge lever, the setting lever 17 turns about the shaft 17a in the clockwise direction, while pushing the first actuating lever 10' of the trailing curtain brake at its bent arm 10'b to turn about the shaft 9' in the counterclockwise direction. Similarly to the leading curtain brake, such movement of the first actuating lever 10' causes rotative movement of the second actuating lever 11', until they are reset in the initial positions. When the charging of the shutter has been completed, the setting lever 17 is then turned in the counterclockwise direction by the force of a spring 17b to the initial position, thus being retracted from the path of movement of the bent arm 10b.

Figure 4:
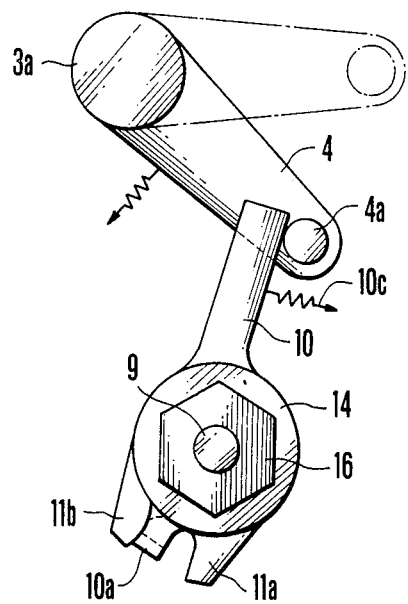
FIGS. 4, 5 and 6 are elevational views of the brake members in different operative positions.
Figure 5:
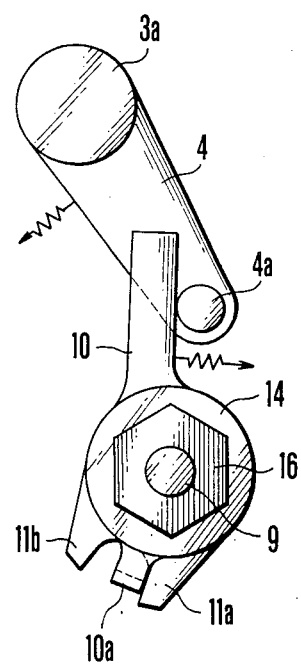
Figure 6:
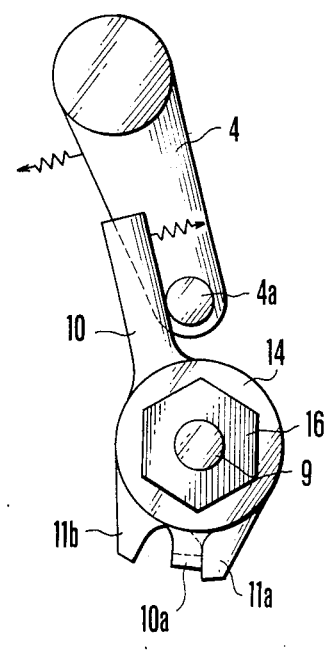

Next, by reference to FIGS. 4 to 6, the operation of the brake is described. Upon actuation of a camera release, the leading blades are first released from latching connection and the drive lever 4 is then driven by a power stored on a drive spring to turn about the shaft 3a in the clockwise direction, from the position of FIG. 1, thereby the operating arms 3 and 3' are turned in the same direction about the shafts 3a and 3'a. As the leading blades of the shutter are moving downward, initiating an exposure, when the shutter blades have moved a prescribed distance, the drive lever 4 as moved from the initial position shown by a dot-and-dash line in FIG. 4 reaches a position shown by a solid line where the upper edge of the blade 2a, or the slit forming border of the leading curtain, nears the lower side 1b of the exposure aperture 1a. At this time, the braking pin 4a on the lever 4 abuts on the first actuating lever 10. Then, said lever 10 has to be turned in the counterclockwise direction against the frictional force with the frictional members 12 and the force of an auxiliary spring 10c. Thus, a braking operation of the leading curtain is initiated. Since the second actuating lever 11 is isolated by the non-rotative intermediate plate 13 and remins stationary during a time interval when the bent portion 10a moves away from one arm 11b to engage with the other arm 11a, the drive lever 4 receives a relatively weak braking force from the friction of the first actuating lever 10 and the assistant spring, gradually decreasing its speed. Soon after the slit forming border of the leading blade 2a has passed the lower side 1b of the exposure aperture 1a, the bent portion 10a of the first actuating lever 10 abuts on the other arm 11a of the second actuating lever 11 as shown in FIG. 5 and turns said lever in unison therewith by which friction the braking force is increased. Thus, the drive lever 4 is rapidly braked to stop completely in a prescribed position of FIG. 6.

In the case of the operation of the trailing curtain, the brake operates in a similar manner. In this case, as the drive lever 7 turns in the clockwise direction, the braking pin 7a thereon abuts on the arm 10'c of the first actuating lever 10' which has so far been stationary in the position of FIG. 1 and then turns the lever about the shaft 9' in the clockwise direction. Thus, a braking operation is initiated. This position lies ahead from the position at which the slit forming edge of the trailing blade 5a reaches the lower side 1b of the aperture 1a. Similarly to the case of the leading curtain, a relatively weak braking force of the first actuating lever gradually decreases the speed of movement of the trailing blades so as not to give any shock to the blades. Soon after the slit forming edge of the trailing blade has passed the lower side of the aperture 1a, similarly to the case of the leading curtain, the second actuating lever 11' starts to rotate, braking the trailing curtain with a relatively strong force.

In the above-described construction and arrangement of the parts, the frictional force of the brake can be adjusted by changing the pushing pressure of the spring. Instead of this, it is also possible to obtain an optimum braking force by changing the areas of the frictional member for giving a frictional force to the first actuating lever and the frictional member for giving a frictional force to the second actuating lever.

Also, the centers of rotation of the first and second actuating levers may be otherwise offset from each other and the lever ratio is changed so that the braking force gradually increases.

As has been described above, the present invention is to provide for the braking device with a first brake actuating lever and a second brake actuating lever, whereby during the time from the initiation of a braking operation to a moment at which the slit forming edge of the shutter blade goes over the exposure aperture, the shutter blades are braked only by the first actuating lever with a relatively weak force, and as soon as the exposure aperture is fully opened or closed, the braking force of the second actuating lever is added to that of the first actuating lever to form the combined braking force of sufficiently large magnitude, thereby giving an advantage that the shock to the shutter blades is remarkably reduced to prevent deformation of the blade from occurring when braked. Therefore, the durability of the shutter blades is remarkably improved, and the possibility of damaging the trailing curtain when the slit forming edge collides against the edge of the exposure aperture can be reduced to almost zero.

Though this embodiment has been described in connection with the brake actuating levers arranged to engage the shutter drive levers through which the shutter blades are braked, the present invention is not confined thereto. A modification may be made such that the first actuating lever is arranged to act on another part which moves when the shutter blades run, for example, the shutter operating arm to brake the shutter blades. It is also to be understood that the present invention is applied not only to the blade type focal plane shutters as shown in the embodiment but also to the web type focal plane shutter.

What is claimed is:

1. A braking device for a focal plane shutter comprising:
   (a) a shutter operating member arranged to move when a shutter curtain runs;
   (b) a first brake member arranged upon engagement with said shutter operating member to be rotatable;
   (c) a second brake member arranged upon engagement with said first brake member to be rotatable; and
   (d) a frictional member and a spring member for giving a frictional force to said first and said second brake members, whereby said first brake member engages with said shutter operating member in the early stage of braking and then turns in engagement therewith to give a relatively weak braking force to said shutter operating member, and said second brake member engages with said first brake member in the closing stage of braking and then turns along therewith to give a strong braking force to said shutter operating member.

2. A braking device for a focal plane shutter comprising:
   (a) a shutter operating member arranged to rotate when a shutter curtain runs;
   (b) a first brake actuating member arranged upon engagement with said shutter operating member to be rotatable about a fixed shaft;
   (c) a second brake actuating member arranged upon engagement with said first brake actuating member to be rotatable about said fixed shaft; and
   (d) frictional members for giving said first and said second brake actuating members respective individual frictional forces and one spring member, whereby said first brake actuating member engages with said shutter operating member when a slit forming border of a shutter curtain nears the terminal side of an exposure aperture and solely gives a braking force to said member, and, after said slit forming border has passed the terminal end the exposure aperture, it cooperates with said brake actuating member to a braking force to the shutter operating member.

3. A braking device according to claim 1, wherein said first brake member and said second brake member are supported to be rotatable about a common brake shaft, and are pressed by said spring member in superimposed relation along with frictional members and a stationary member sandwiched therebetween.

4. A braking device for a shutter including a shutter curtain, comprising:
   (a) a shutter operating member arranged to move when said shutter curtain runs; and
   (b) braking means for imparting a braking force to said shutter operating member, said braking means imparting a first braking force to said shutter operating member in an early stage of braking operation, and subsequently imparting a second braking force to said shutter operating member in a closing stage of braking operation, said second braking force being stronger than said first braking force, so as to impart said braking force to said shutter operating member in a substantially overlapping manner.

5. A braking device according to claim 4, wherein said braking means includes a frictional member.

6. A braking device according to claim 4, wherein said braking means includes a spring.

7. A braking device according to claim 4, wherein said braking means includes a first braking member for imparting a braking force to said shutter operating member during a period from the early stage of braking operation to the closing stage of braking operation, and a second braking member for imparting a braking force to said shutter operating member only in the closing stage of braking operation.

8. A braking device for a shutter including a shutter curtain, comprising:
   (a) a shutter operating member arranged to move when said shutte curtain runs;
   (b) a first brake member for imparting a first braking force to said shutter operating member from an early stage of braking to a closing stage of braking; and
   (c) a second brake member for imparting a second braking force to said shutter operating member in the closing stage of braking, said second braking force overlapping said first braking force.

* * * * *